June 9, 1925.
J. SULLIVAN
PIPE FITTING
Filed Jan. 28, 1924
1,540,816
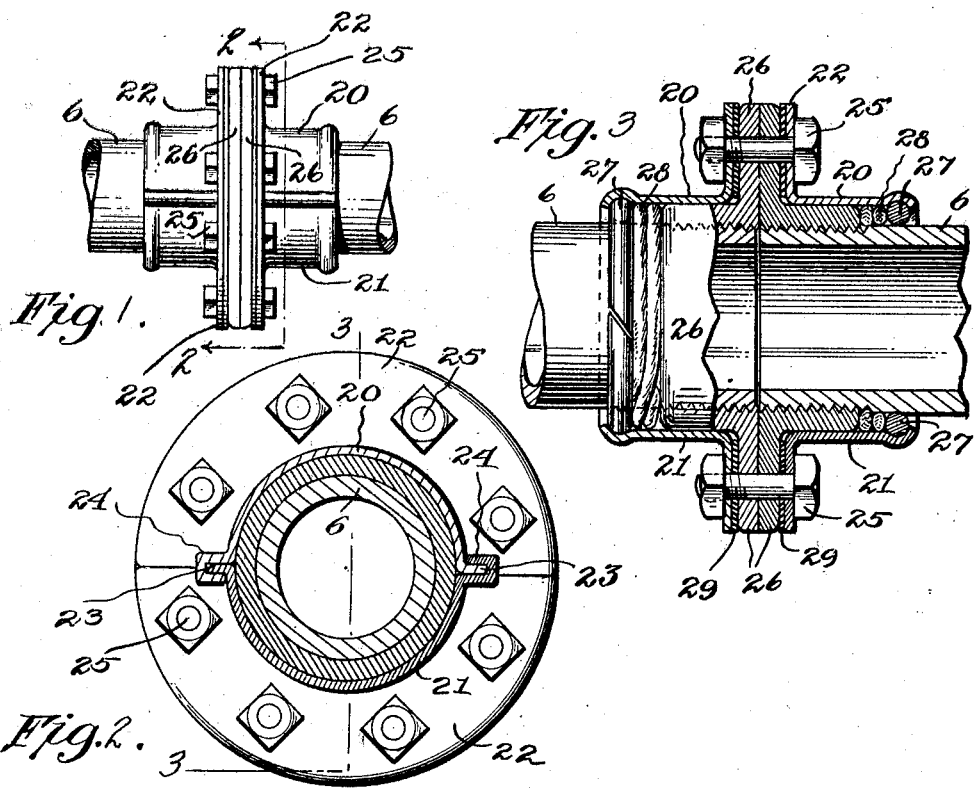

Patented June 9, 1925.

1,540,816

UNITED STATES PATENT OFFICE.

JEREMIAH SULLIVAN, OF DUDLEY, PENNSYLVANIA.

PIPE FITTING.

Application filed January 28, 1924. Serial No. 689,065.

*To all whom it may concern:*

Be it known that I, JEREMIAH SULLIVAN, a citizen of the United States of America, residing at Dudley, in the county of Huntingdon and State of Pennsylvania, have invented certain new and useful Improvements in Pipe Fittings, of which the following is a specification.

The object of the present invention is to provide a pipe fitting or coupling adapted to be applied to pipe lines, and by means of which an ordinary threaded flange coupling may be converted into a calked joint, with lead or composition calking. It will be found particularly useful in repairing leaky joints or couplings in water and low pressure steam pipes.

The device embodies a coupling sleeve or hub made in two sections which can be placed around an existing flange coupling, the sections being united by a tongue and groove joint; and containing a space to receive calking of a suitable type arranged at or around the ends of the existing flange hub, thereby sealing the same to prevent leak.

The invention is illustrated in the accompanying drawings in which Fig. 1 is a side elevation of the fitting applied to a flanged joint. Fig. 2 is a section on the line 2—2 of Fig. 1. Fig. 3 is a section on the line 3—3 of Fig. 2.

In the form shown, the fitting comprises a pair of semicircular members 20 and 21 each of which has a flange 22 and a hub or sleeve portion provided with a tongue 23 at one edge and a groove 24 at the other, and when these sections are joined around the pipe end 6, they form a flange which may be connected by bolts 25 to a companion flange or fitting similarly mounted on the end of the meeting pipe sections 6, each of which is provided, as usual in a flange joint, with flanges 26 the hubs of which are covered or enclosed by the hub or sleeve portions 20 or 21 of my fitting. In this form the calking is inserted as indicated at 27. This calking surrounding the end of the hub of the flange 26 where it is screwed on the pipe sections as is usual in a threaded flange coupling. In this form also I insert a rubber gasket 29 between the flanges 22 and 26 to prevent leak therebetween.

The tongue and groove joint with the calking makes a tight seal around a leaky coupling, and my device may be applied to existing couplings without removing the same from the pipe or otherwise disconnecting the pipe line. This will be found very convenient for making quick repairs.

I claim:

A repair pipe fitting adapted to be applied to flanged pipe couplings, said fitting comprising a pair of semicircular members each of which has a semicircular flange, said members having hub portions with tongue and groove joints at their meeting edges, and packing confined against the hub of the pipe coupling and also between the flange of the fitting member and the flange of said coupling.

In testimony whereof I affix my signature in the presence of two witnesses.

JEREMIAH SULLIVAN.

Witnesses:
 CARL A. GEIER,
 RICHARD THOMAS.